(12) United States Patent
Yoshizaki

(10) Patent No.: US 8,684,307 B2
(45) Date of Patent: Apr. 1, 2014

(54) DOOR STRUCTURE OF AIRCRAFT RESTROOM

(75) Inventor: Tomohiro Yoshizaki, Tokyo (JP)

(73) Assignee: Jamco Corporation, Tokyo (JP)

( * ) Notice: Subject to any disclaimer, the term of this patent is extended or adjusted under 35 U.S.C. 154(b) by 72 days.

(21) Appl. No.: 12/722,897

(22) Filed: Mar. 12, 2010

(65) Prior Publication Data

US 2010/0237193 A1 Sep. 23, 2010

(30) Foreign Application Priority Data

Mar. 17, 2009 (JP) ................................. 2009-063886

(51) Int. Cl.
*B64D 11/00* (2006.01)
(52) U.S. Cl.
USPC ............................. 244/118.5; 49/246; 49/250
(58) Field of Classification Search
USPC ........... 49/246, 250, 252, 253, 260, 453, 394, 49/333; 244/118.5; 16/82, 85
See application file for complete search history.

(56) References Cited

U.S. PATENT DOCUMENTS

| | | | | |
|---|---|---|---|---|
| 2,019,527 A | * | 11/1935 | Ellison | 49/252 |
| 3,048,898 A | * | 8/1962 | Davis | 49/193 |
| 3,318,047 A | * | 5/1967 | Carson | 49/149 |
| 4,381,877 A | * | 5/1983 | Stark | 312/329 |
| 4,672,772 A | * | 6/1987 | Nakamura | 49/253 |
| 5,150,863 A | * | 9/1992 | Hozumi | 244/118.5 |
| 5,309,676 A | | 5/1994 | Appelmann et al. | |
| 5,517,720 A | * | 5/1996 | Anderson et al. | 16/85 |
| 5,697,122 A | * | 12/1997 | Okabe et al. | 16/82 |
| 6,702,231 B2 | * | 3/2004 | Ward | 244/118.5 |
| 6,866,309 B1 | * | 3/2005 | Marks | 292/57 |

(Continued)

FOREIGN PATENT DOCUMENTS

| | | |
|---|---|---|
| JP | 4-151399 A | 5/1992 |
| JP | 11-324473 A | 11/1999 |

(Continued)

OTHER PUBLICATIONS

Extended European Search Report dated Mar. 14, 2013, issued in corresponding European Patent Application No. 10405053.9 (6 pages).

(Continued)

*Primary Examiner* — Katherine Mitchell
*Assistant Examiner* — Catherine A Kelly
(74) *Attorney, Agent, or Firm* — Westerman, Hattori, Daniels & Adrian, LLP

(57) ABSTRACT

There is provided a space-saving and compact swing type door structure of an aircraft restroom, in which a door is automatically closed and which is easy to use for a passenger using the restroom. The swing type door (40) is slidably hung at its upper end edge (44) from a rail disposed at an upper portion of a door frame by a guide structure including a slide pin (46) and is turnably connected in a predetermined position different from the hung position to the door frame by a linkage (60). Swinging operation in opening the door (40) deforms a spring provided in an automatic closing device (50). When a hand is released from the door (40), the door (40) is constantly biased in a closing direction by spring resilience through the linkage (60) and automatically returns to a closed position. Therefore, the restroom becomes easy to use, an aisle in front of the restroom can be used in an emergency, and it is possible to avoid contingencies caused by false recognition of an escape hatch.

6 Claims, 14 Drawing Sheets

(56) References Cited

U.S. PATENT DOCUMENTS

| | | | |
|---|---|---|---|
| 7,562,757 B2* | 7/2009 | Dubach et al. | 192/215 |
| 7,565,776 B2* | 7/2009 | Wolf et al. | 52/202 |
| 7,997,028 B2* | 8/2011 | Holst | 49/246 |

FOREIGN PATENT DOCUMENTS

| | | | |
|---|---|---|---|
| JP | 2000-248822 A | 9/2000 |
| JP | 2002-242524 A | 8/2002 |
| JP | 2002-266548 A | 9/2002 |
| JP | 2004-190301 A | 7/2004 |
| JP | 2008-6915 A | 1/2008 |
| WO | 2006-120742 A1 | 11/2006 |

OTHER PUBLICATIONS

Japanese Office Action dated Feb. 26, 2013, issued in corresponding Japanese Patent Application No. 2009-063886 (3 pages).

* cited by examiner

DOOR STRUCTURE OF AIRCRAFT RESTROOM

The present application is based on and claims priority of Japanese patent application No. 2009-063886 filed on Mar. 17, 2009, the entire contents of which are hereby incorporated by reference.

BACKGROUND OF THE INVENTION

1. Field of the Invention

The present invention relates to a door structure provided for coming into and going out of a restroom installed in an aircraft.

2. Description of the Related Art

Conventionally, doors of various opening/closing types have been used as restroom doors provided for coming into and going out of a restroom installed in an aircraft. At present, the types have become standardized as two types, i.e., a hinge panel type (opening outward) and a folding type (folding inward).

Because the hinge panel type door is basically an outward opening door that opens outward of the restroom, the door may block an aisle in front of the restroom when it opens. Such a door structure may obstruct passengers and crew escaping through the aisle in an emergency. Moreover, the open door is not designed to close automatically and needs to be closed manually. Because the folding type door is less common in houses and general buildings, passengers are likely to be confused about how to use it and the door is not really easy to use. Although the folding door folds inside the restroom and it does not block an aisle in opening and closing, the door in the folded state moves in a space in the restroom and a passenger needs to avoid the moving door.

If a passenger in a wheelchair uses the restroom, a locus of the folding type door interferes with the wheelchair. Therefore, the folding type door cannot be used as a door for a wheelchair restroom. Therefore, a restroom having the hinge panel type door is necessary for passengers using wheelchairs and two types of doors are often necessary in the same aircraft, which is disadvantageous to many users. Moreover, the folding door is opened by pulling a handle at a central hinge portion of the door and therefore it is difficult for a passenger with a hand disability to open the door from inside.

As described above, although there are doors moving in various manners, no restroom door satisfying requirements peculiar to aircraft such as functions, safety, maintainability, and light weight has been provided so far.

There is an example of a structure of a restroom unit for aircraft, which is formed compactly so that it can be installed in a small airplane, as disclosed in Japanese Patent Application Laid-Open No. 2008-6915. In this restroom unit for the aircraft, a door that can be opened and closed is provided on a side face of a restroom main body integrally formed in a box shape. This door is merely shown as left and right split doors and does not go much beyond conventional doors.

There is also an opening and closing device suitable for emergency or rescue activities with a door that can be opened or closed normally at normal times but can be opened or closed in an opposite direction (Japanese Patent Application Laid-Open No. 11-324473). This door opening and closing device is provided with a door frame, a door body (door panel) for opening and closing an opening portion of the door frame, door body supporting means supporting the door body in the opening portion so that the door body can be opened or closed, and door stops for holding the door body in a closed position. Door stops are located at a side wall of the opening portion made up of the door frame. The door body can be opened or closed by pulling toward a user or pushing in a door thickness direction at normal times but the door body can be forcibly opened in the opposite direction to the normal opening and closing direction. At normal times, the opening and closing direction of the door body is restricted by the door stops and the door body can be opened or closed toward the user or forward away from the user. On the other hand, the door body can be forcibly opened in the opposite direction to the normal opening and closing direction. Therefore, even if a person has fallen down on an indoor side where a door end side of the door body moves and the person who fell down obstructs the movement, the door body can be forcibly opened in the opposite direction.

There is also a slide-swing type door device in which a door panel is opened or closed by swinging the door panel in a front-rear direction while sliding the door panel in a width (lateral) direction. This door device has excellent partitioning properties (hermeticity, sound insulating properties), ease of opening and closing operations, space saving properties in opening and closing, and a compact entire device structure inherently required of doors. Moreover, door fitting works and maintenance are facilitated, the device is excellent in appearance, and is free of barriers, which is an improvement in usability (Japanese Patent Application Laid-Open No. 2000-248822).

There is also a slide-swing type door formed by providing a door panel in a frame body forming an opening portion so as to swing open or close in a front-rear direction while sliding in a width direction of the opening portion. The door includes a support fixed along one vertical frame of the frame body, a shaft body arranged along a longitudinal direction inside the support, support means for supporting the shaft body so that the shaft body can turn around its axis inside the support, and an upper rotation arm and a lower rotation arm having one ends secured respectively to upper and lower ends of the rotating shaft body and the other ends turnably supported at predetermined positions of an upper end face and a lower end face of the door panel (Japanese Patent Application Laid-Open No. 2002-242524).

Furthermore, there is also a swing-slide type door device in which a door panel slides while swinging along support bodies such as rails to thereby open or close a door opening and which can secure sealing properties of the door panel in a closed state of the door and enables a smooth opening operation of the door (Japanese Patent Application Laid-Open No. 2002-266548).

The space-saving and compact swing type door structure used for coming into and going out of the aircraft restroom has problems to be solved, i.e., to automatically close the door when a user of the restroom forgets to close it and to easily open the closed door and detach the door from a door frame by crew for security without using tools.

SUMMARY OF THE INVENTION

It is an object of the present invention, in a space-saving and compact swing type door structure, to provide a door structure of an aircraft restroom, which is useful as a door is automatically closed even if a user of the restroom forgets to close the door and which does not harm an environment in the aircraft by not blocking an aisle to interfere with other passengers and by clearing the aisle for passengers escaping in an emergency. Moreover, it is an object of the invention to provide a door structure of an aircraft restroom, in which crew can open the door that is closed from inside or easily detach the door from a door frame in case of emergency, e.g., when a user cannot move in the restroom.

In order to achieve the above-described object, the present invention provides a swing type door structure of an aircraft restroom including an door slidably hung at its upper end edge from a rail disposed at an upper portion of a door frame and a linkage that turnably connects the upper end edge of the door in a predetermined position different from the hung position to the door frame, wherein an automatic closing device is provided for applying resilience of a spring to the linkage to constantly bias the door in a closing direction.

According to the door structure of the aircraft restroom, when the door is opened, the spring of the automatic closing device is deformed by swinging operation in opening the door and resilience generated at this time acts on the linkage. In this way, the automatic closing device constantly biases the door in a closing direction. As a result, if a passenger using the restroom releases his/her hand from the door, the door always and automatically returns to a closed position and is useful.

In the door structure of the aircraft restroom, the spring of the automatic closing device may be a torsion spring for converting turning of the linkage into torsional deformation. The automatic closing device may have a damper for reducing a turning speed of the linkage turned in a returning direction by the resilience of the torsion spring. The door released from a hand automatically moves in the closing direction. Speed of the door is adjusted by the damper so as not to be excessively high, and as a result, a noise level of closing of the door is lowered as well giving consideration to a cabin environment.

In the door structure of the aircraft restroom, the door is slidably engaged in a position of its lower end edge corresponding to the hung position with a rail disposed at a lower portion of the door frame. Therefore, operation in opening and closing of the door is stabilized to suppress vibrations of the aircraft and prevent resonance of the door in the closing operation to achieve quietness. Guiding by the rails helps move the door smoothly. Because a pivot portion between the door and the linkage is provided with a release lever for detaching and attaching the pivot portion, it is possible to detach the entire door without using tools in an emergency, e.g., when a passenger falls down in the restroom. If a door trim on a hinge side of the door is made of soft rubber, the door does not injure fingers even if a user gets his/her fingers caught in the door.

In the door structure of the aircraft restroom, shapes of door handles are devised. The door handle provided outside the restroom of the door may be a paddle type handle and the door handle provided inside the restroom of the door may be a lever type handle. Provided outside the restroom is the paddle type handle that a user can operate without holding it and provided inside the restroom is the lever type handle and therefore even a passenger having a disability in his/her hand can easily open the door.

In the door structure of the aircraft restroom, as a main lock by operation of the door handles, the door is latch-engaged with or disengaged from the door frame by a main latch protruding and retracting at a side end edge of the door near the door handles and a sub-latch protruding and retracting via a rod at a side end edge of the door far from the door handle. Therefore, in this case, the latches are disposed on the left and right sides of the door and it is possible to firmly fix the door when the door is closed. Moreover, the left and right latches move synchronously through the rod and therefore need not be operated separately. A slide bolt for auxiliary locking is provided in an adjacent position to the lever type handle and a hidden lever for releasing the auxiliary lock by the slide bolt without using tools may be mounted on the paddle type handle. In the event of latch failure or when a passenger cannot release the auxiliary lock from inside, the crew can operate the hidden lever to thereby release the auxiliary lock of the door without using the tools, which provides a safety measure. Furthermore, the door panel may be made up of a honeycomb panel, in which case it is possible to reduce the door in weight while maintaining rigidity.

Because the door structure of the aircraft restroom according to the invention is formed as described above, an inner locus of the door moves along an inner wall of the restroom, although the door is a panel type door that is opened and closed in the same way as a general house door. Therefore, the locus becomes an obstruction in a smaller area in the restroom than a locus of a conventional folding type door and the door structure can be mounted on a wheelchair restroom and is extremely useful. The door does not greatly jut out when it opens and therefore does not severely block the aisle. Moreover, the door does not remain open but automatically closes if a user of the restroom forgets to close the door. As a result, the door does not interfere with other passengers and does not impair an environment in the aircraft. In this way, in an emergency, the aisle for escaping passengers and the like is secured near the restroom. If the aircraft is full of smoke, the passengers escape along evacuation lights disposed on a floor. If the door of the restroom is open, the passengers may mistake the door for an escape hatch, which may cause more confusion. However, the door is automatically closed and does not remain open and therefore it is possible to avoid such a situation. Moreover, it is possible to unify doors for all restrooms in the aircraft. By unifying how to handle and operate the doors, it is possible to improve convenience of the passengers and maintainability.

Because the locus on the outside of the restroom is also kept within a small area, even a wheelchair user can come closer to the door, which greatly improves operability as compared with a conventional panel type door. With regard to safety, to detach a door in an emergency, a conventional folding type door needs to be slightly folded inward because of its mechanism and is considerably heavy if a person has fallen over the door and a hinge panel type door cannot be detached without using tools. However, the door according to the invention can be detached from the restroom main body with a much smaller force by operating the tab from outside to detach a pin at the pivot portion of the linkage and sliding the door sideways. A general house door is not provided with such a mechanism in the first place. Although the opening and closing handles and the locking slide bolt are separate from each other in the operating portions of the latches in the conventional restroom door structure, they are compactly put together to thereby improve operability and economic efficiency.

DETAILED DESCRIPTION OF THE INVENTION

Figure 1:
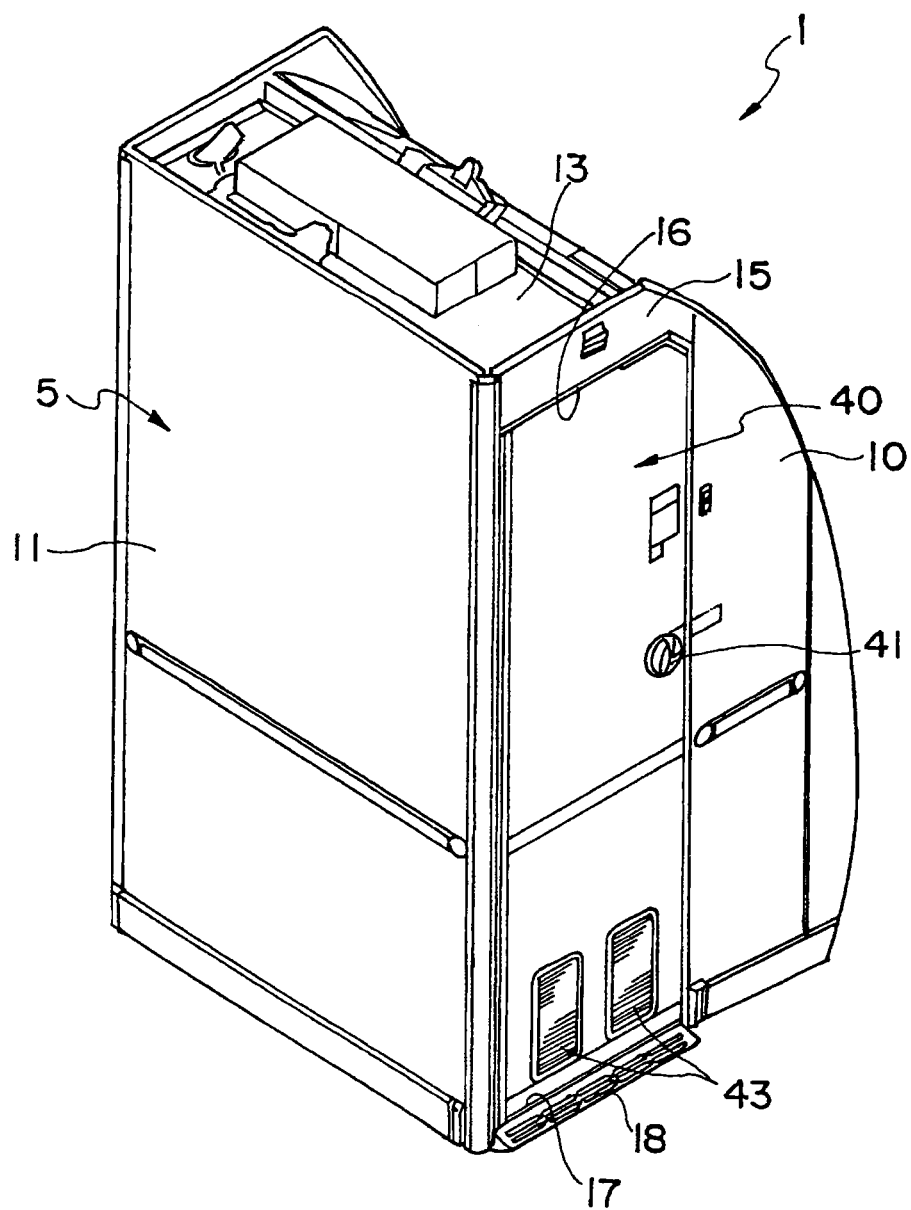
FIG. 1 is an external perspective view of a door structure of an aircraft restroom according to the present invention.
Figure 2:
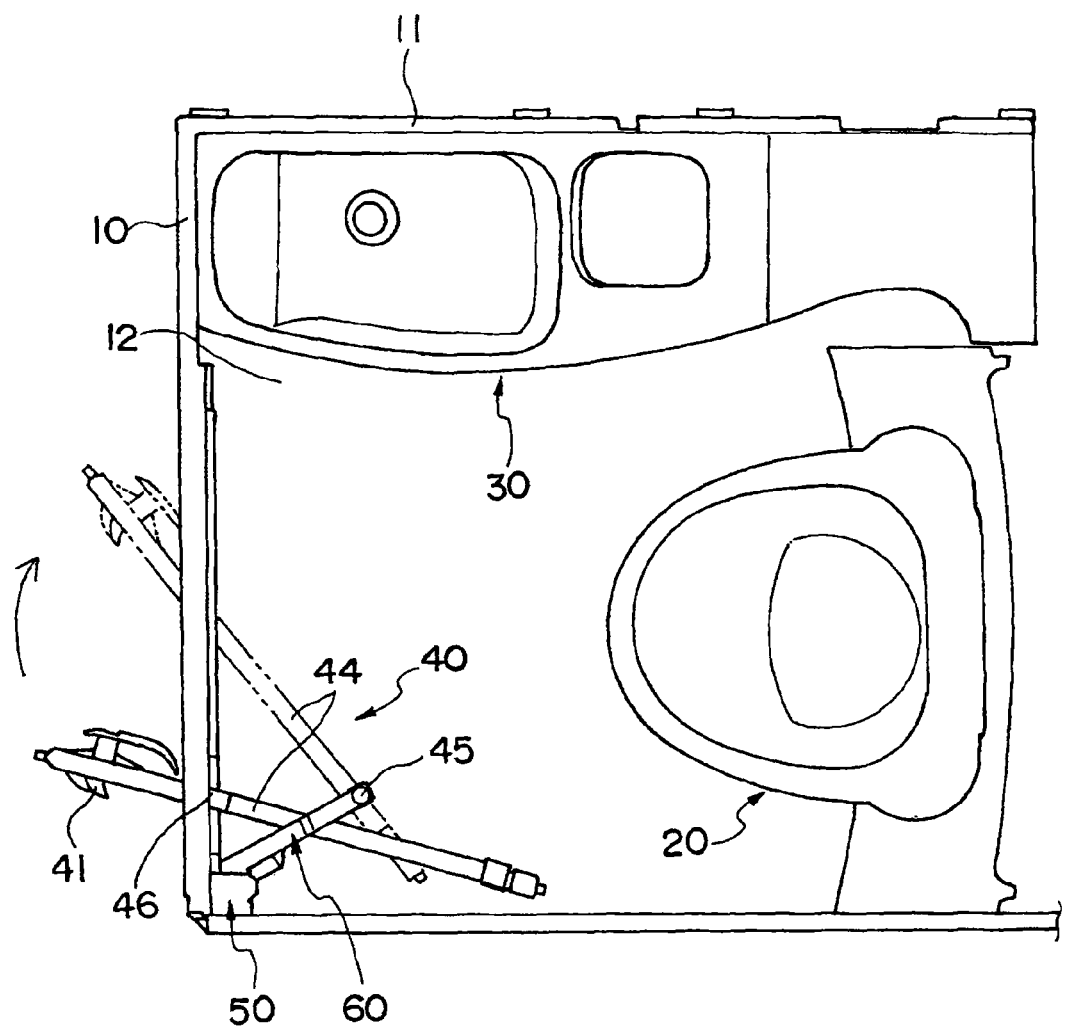
FIG. 2 is a top view of the restroom showing a door locus at time intervals during opening and closing of the door structure of the aircraft restroom shown in FIG. 1.
Figure 3:
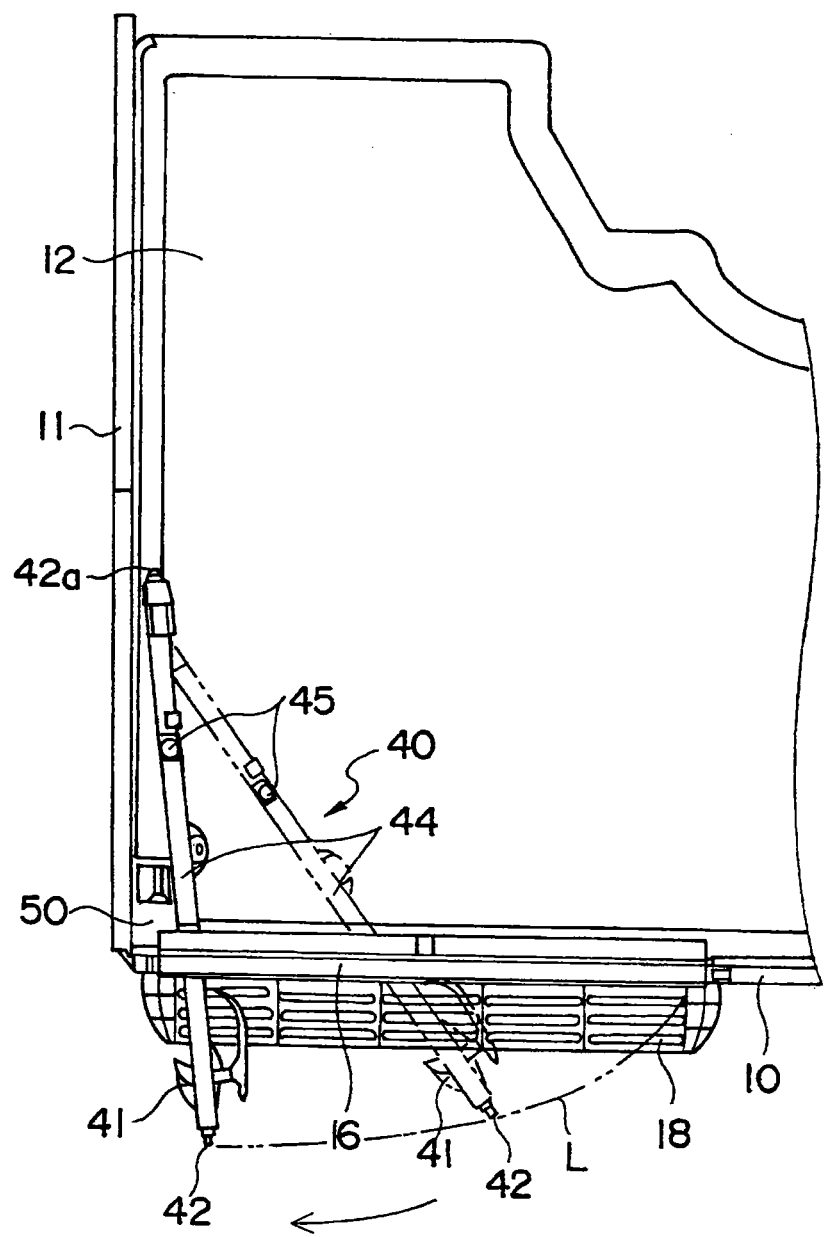
FIG. 3 is an enlarged plan view of the door locus corresponding to FIG. 2.
Figure 4:
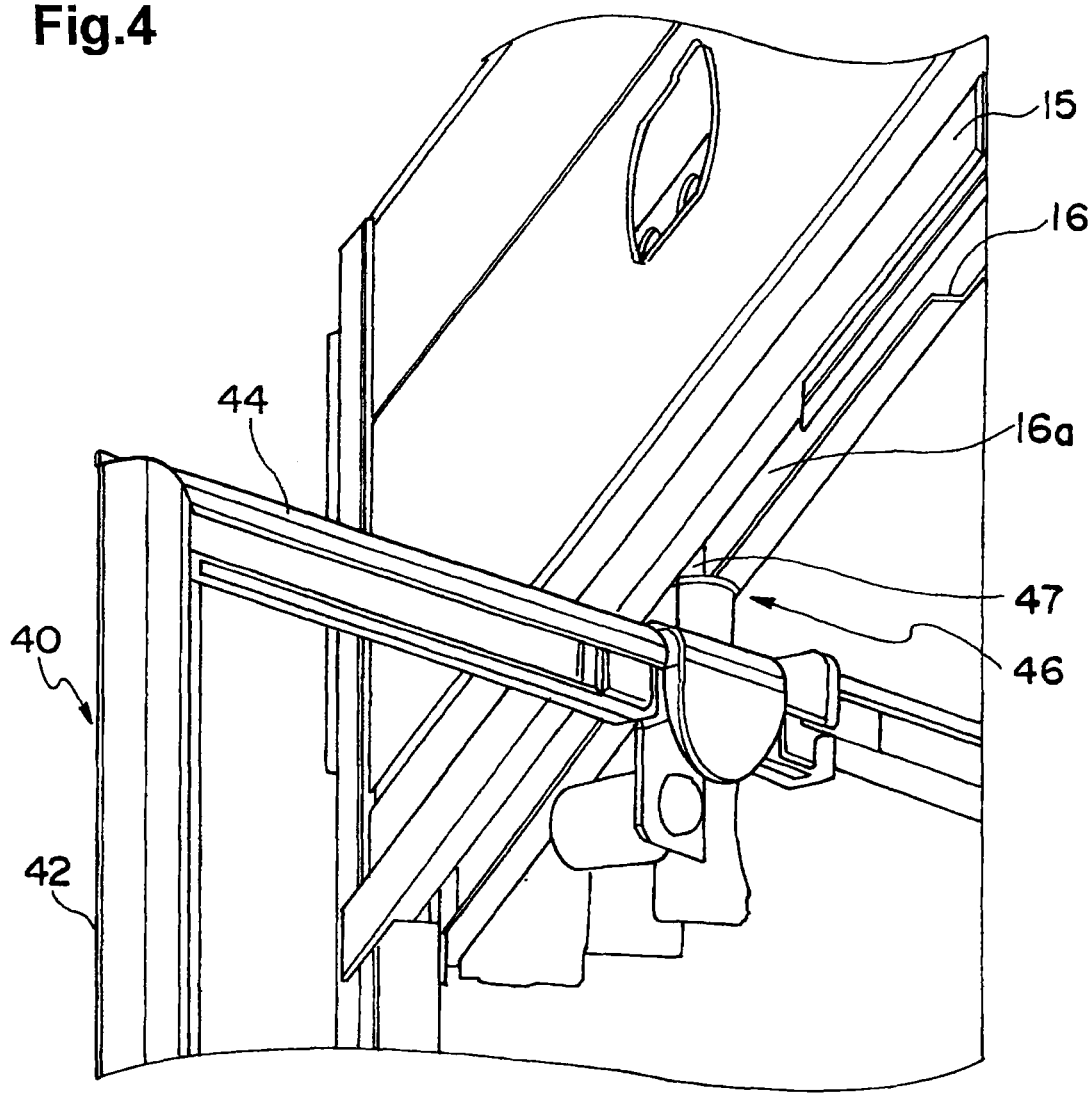
FIG. 4 is a perspective view of a sliding guide structure at an upper edge portion of the door structure of the aircraft restroom shown in FIG. 1.
Figure 5:
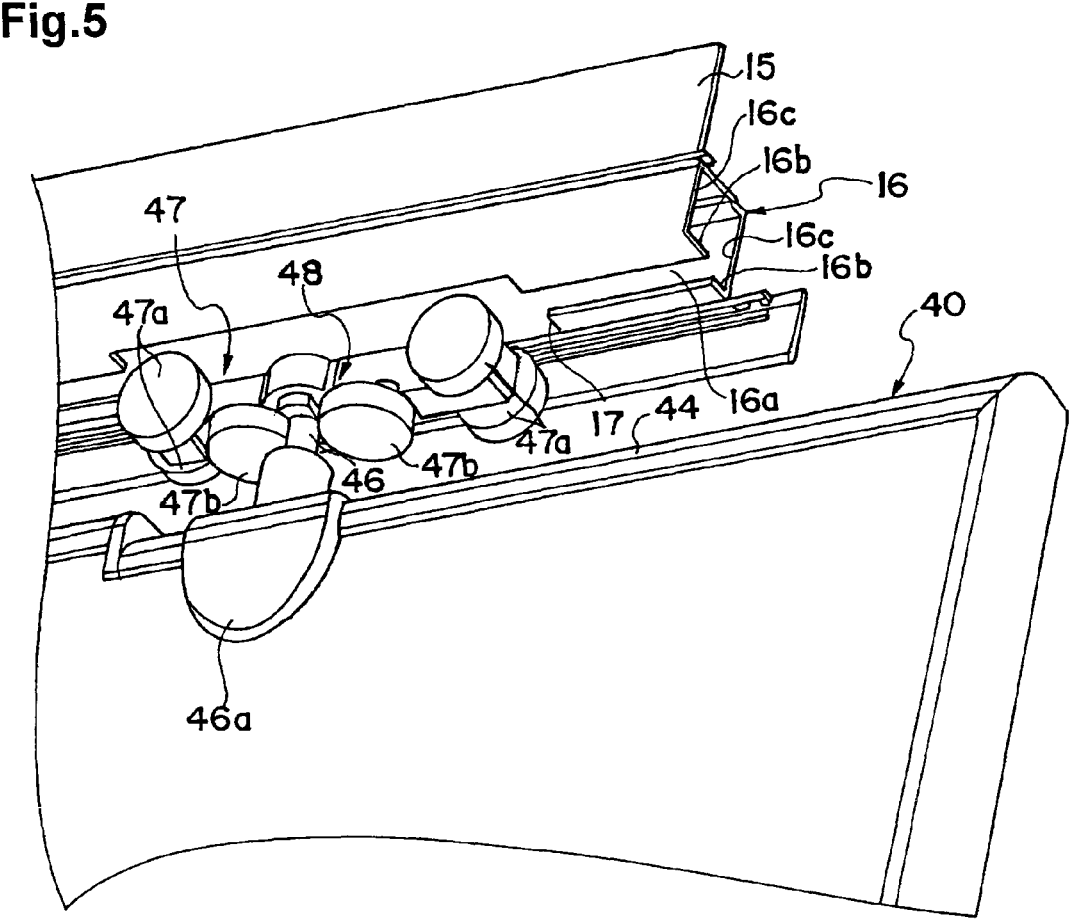
FIG. 5 is a perspective view showing a manner in which the sliding guide structure shown in FIG. 4 is attached or detached through an attachment and detachment notch.
Figure 6:
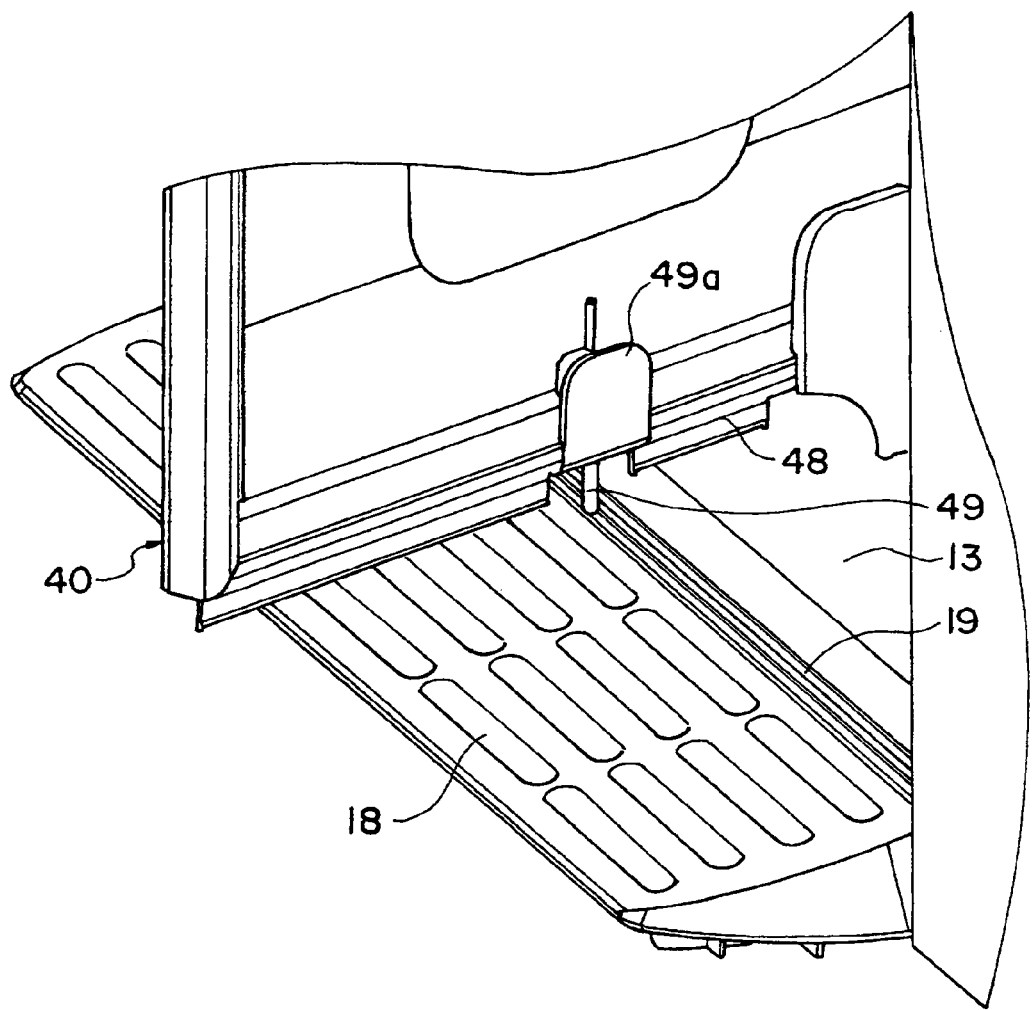
FIG. 6 is a perspective view of a sliding guide structure at a lower edge portion of the door structure of the aircraft restroom shown in FIG. 1.

An embodiment of a door structure of an aircraft restroom according to the present invention will be described below based on the accompanying drawings. FIG. 1 is an external perspective view of a door structure of an aircraft restroom according to the present invention. FIG. 2 is a (mirror-reversed) top view of the restroom showing a door locus at time intervals during opening and closing of the door structure of the aircraft restroom shown in FIG. 1. FIG. 3 is an enlarged plan view of the door locus during opening and closing of the door structure shown in FIG. 1. FIG. 4 is a perspective view of a sliding guide structure at an upper edge portion of the door structure of the aircraft restroom shown in FIGS. 1 and 2. FIG. 5 is a perspective view showing details of the sliding guide structure shown in FIG. 4. FIG. 6 is a perspective view of a sliding guide structure at a lower edge portion of the door structure of the aircraft restroom shown in FIGS. 1 and 2.

In FIG. 1, a restroom unit generally shown by a reference numeral 1 has a box-shaped restroom main body 5 formed by assembling panel materials and is installed at an appropriate position on a floor board of an aircraft. The restroom main body 5 is made up of a front panel 10, a side wall panel 11, a floor panel 12, a ceiling panel 13, and a back wall panel (not shown) into the box shape. An door (hereafter abbreviated as "door") 40 is provided on a front face of the restroom main body 5 facing an aisle of the aircraft and a passenger or the like can open or close the door 40 to come into and go out of the restroom main body 5 passing by the open door 40.

The door 40 is provided to be able to close a door opening portion formed by cutting out a part of the front panel 10 and has such a size as to occupy a part of an entire width of the front panel 10 in a lateral width direction and occupy the most of an entire height of the front panel 10 in a vertical direction except an area 15 at an upper portion where a door opening and closing mechanism is disposed. A honeycomb panel is used for the door 40 to reduce the door 40 in weight while maintaining rigidity. In association with the door 40, a door handle portion 41 used for opening and closing operations and louver portions 43 for inflow of air from the aisle side are provided. A sloping doorsill 18 corresponding to height of the floor panel and for preventing stumbling is provided under the door 40. A display portion for showing whether the restroom is occupied or unoccupied by colors, for example, can be provided near the door handle portion 41.

FIG. 2 shows a unit with a different layout from the restroom unit shown in FIG. 1. As shown in FIG. 2, a toilet unit 20 at a far end in front of the door 40 and a vanity unit 30 positioned beside the toilet unit 20 and along the side wall panel 11 are disposed as lavatory equipment in the restroom main body 5. The equipment may be known units and will not be described in detail. The swing type door 40 entirely made up of one door plate is provided on the front face of the restroom main body 5.

The swing type door 40 is connected at an upper portion to an automatic closing device 50 mounted on a box-shaped upper corner portion of the restroom unit with a linkage 60 interposed between the door 40 and the device 50. The linkage 60 has one end portion turnably connected to the automatic closing device 50 and the other end portion turnably connected to an upper end edge 44 of an upper side of the door 40 at a pivot portion (joint pin) 45. The linkage 60 is positioned above the upper end edge 44 of the door 40 and therefore does not directly interfere with the panel of the door 40. The pivot portion 45 at the upper end edge 44 of the door 40 is disposed at a position deviated toward a door drive portion 50 from a central position of the upper end edge 44. FIG. 3 shows a locus L drawn by a side end edge 42 of the door 40 shown in FIG. 1 when the door 40 is opened or closed. The other side end edge 42a of the door 40 moves along the side wall panel 11 when the door 40 is opened or closed.

FIG. 4 shows the sliding guide structure at the upper portion of the door 40 in the perspective view. FIG. 5 is the perspective view showing details of the sliding guide structure shown in FIG. 4. A bracket 46a provided astride the upper end edge 44 is fixed to a position of the upper end edge 44 of the door 40 deviated toward the door handle portion 41 from the center and a slide pin 46 is provided on the bracket 46a to protrude upward. A rail 16 is disposed at a lower edge portion of the area 15 of the panel along a longitudinal direction of the lower edge portion and a groove 16a is formed in a central position in a width direction of the rail 16 to extend in a longitudinal direction of the rail 16. On opposite sides of the groove 16a, rail tracks 16b, 16b on which rollers (described later) can roll and inner wall faces 16c, 16c adjacent at right angle to the rail tracks 16b, 16b are formed. The slide pin 46 is fitted in the groove 16a and can slide in the groove 16a as the door 40 is opened or closed.

A roller unit 47 is mounted on a tip end of the slide pin 46. The roller unit 47 has a sash hanger structure including two pairs of (four in total) rolling rollers 47a disposed to sandwich the slide pin 46, having horizontal shafts, and capable of rolling on the rail tracks 16b, 16b of the rail 16 and a pair of guide rollers 47b disposed to sandwich the slide pin 46, having vertical shafts, and capable of coming in contact with the inner wall faces 16c, 16c of the rail 16 to be guided by them. In other words, three rollers (two rolling rollers 47a and one guide roller 47b) are disposed on each side of the slide pin 46. When the slide pin 46 slides in the groove 16a as the door 40 is opened or closed, the roller unit 47 is guided with the respective rolling rollers 47a rolling on the rail tracks 16b, 16b and the guide rollers 47b in contact with the inner wall faces 16c, 16c. Therefore, the door 40 is hung in two different positions on opposite sides of the central position of the upper end edge 44, i.e., by the linkage 60 and the rail 16 through the sliding guide structure. To detach the door 40 in an emergency, it is necessary to detach the slide pin 46 and the roller unit 47 from the rail 16. Therefore, a detachment and attachment notch 17 larger in size than the roller unit 47 is formed in a position slightly deviated from a range of normal movement during opening and closing of the roller unit 47. If the door 40 is moved along the rail 16 until the roller unit 47 is aligned with the position of the detachment and attachment notch 17, the roller unit 47 can be detached through the detachment and attachment notch 17 and the door 40 can be detached from the area 15 at the upper portion of the front panel 10.

Figure 7:
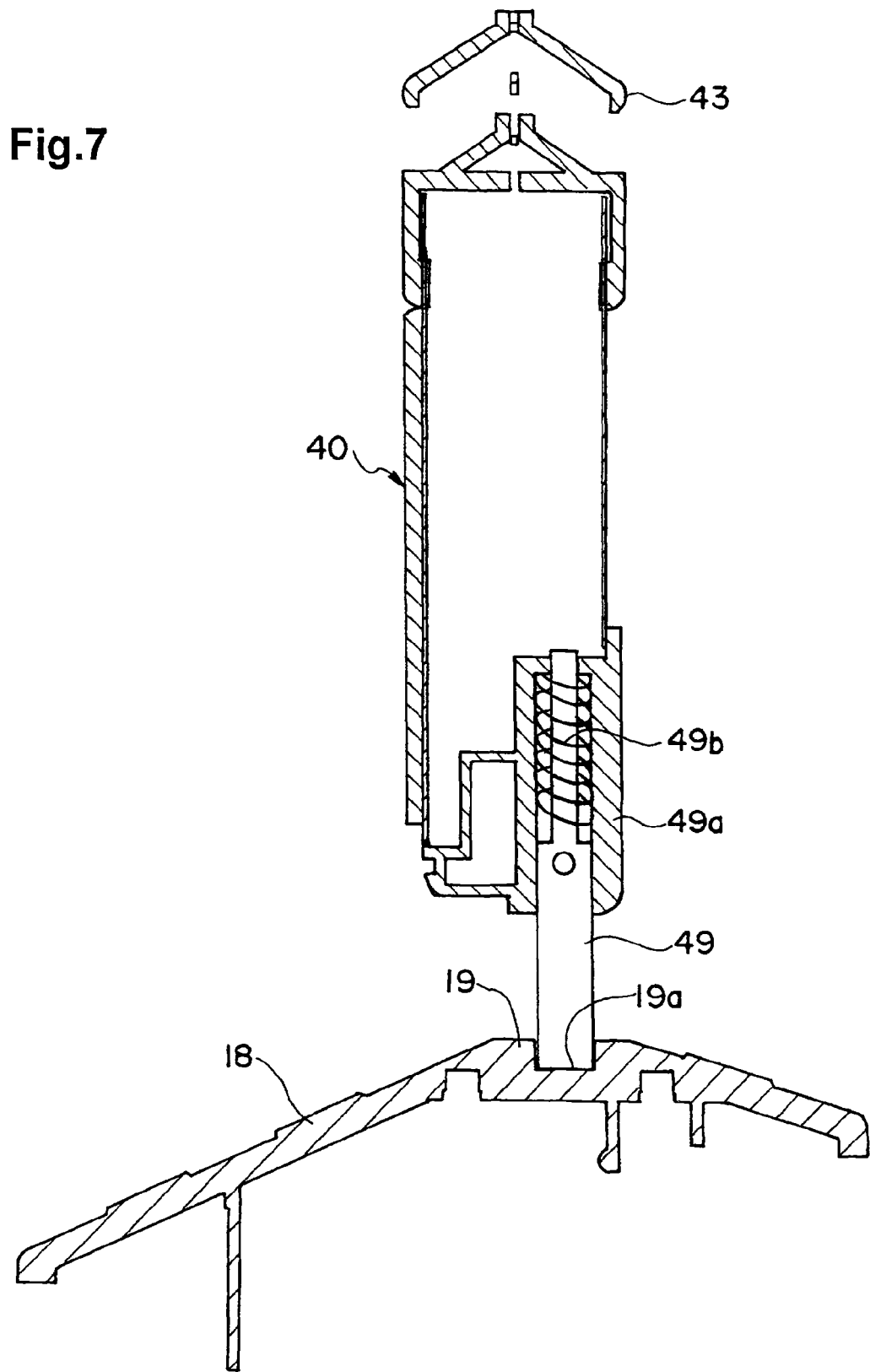
FIG. 7 is a sectional view of the sliding guide structure at the lower edge portion of the door structure of the aircraft restroom shown in FIG. 6.

FIG. 6 shows the sliding guide structure at a lower portion of the door 40 in the perspective view. The door 40 is provided with a slide pin 49 at a position of a lower end edge 48 corresponding to the position of the upper end edge 44 where the slide pin 46 is provided with a bracket 49a interposed between the lower end edge 48 and the slide pin 49. The slide pin 49 is slidably engaged in a rail groove 19a formed in a rail 19 provided to the doorsill 18. As a result, during opening and closing, the slide pins 46 and 49 are restricted and guided by the rails 16 and 19 with respect to the panel area 15 and the doorsill 18 at upper and lower edge portions of the door 40 and therefore stable and smooth opening and closing operation of the door 40 with suppressed vibrations can be obtained. FIG. 7 is a cross-sectional view of the sliding guide structure at a lower portion of the door shown in FIG. 6. The slide pin 49 is mounted in an inside of the panel of the door 40 through a spring 49b and is engaged in the rail groove 19a by a biasing force of the spring 49b. To detach the door 40, the rail 19 is bent over a biasing distance of the spring 49b or a longer distance by stepping on the rail 19 or the like and the slide pin 49 can be detached from the rail groove 19a.

As shown in FIGS. 2 and 3, the door 40 during opening or closing is shown in a plurality of positions and attitudes at some midpoints of opening and closing at time intervals. When the fully closed door 40 is opened by operating the door handle portion 41 in an opening direction shown by an arrow, an opening degree gradually increases while the door 40 is restrained at two points, i.e., the pivot portion 45 connected by the linkage 60 turning about the door drive portion 50 and the slide pin 46 sliding along the rail 16. The opening degree reaches a maximum when the door 40 is in a position substantially along the side wall panel 11 of the restroom main body 5.

Figure 8:
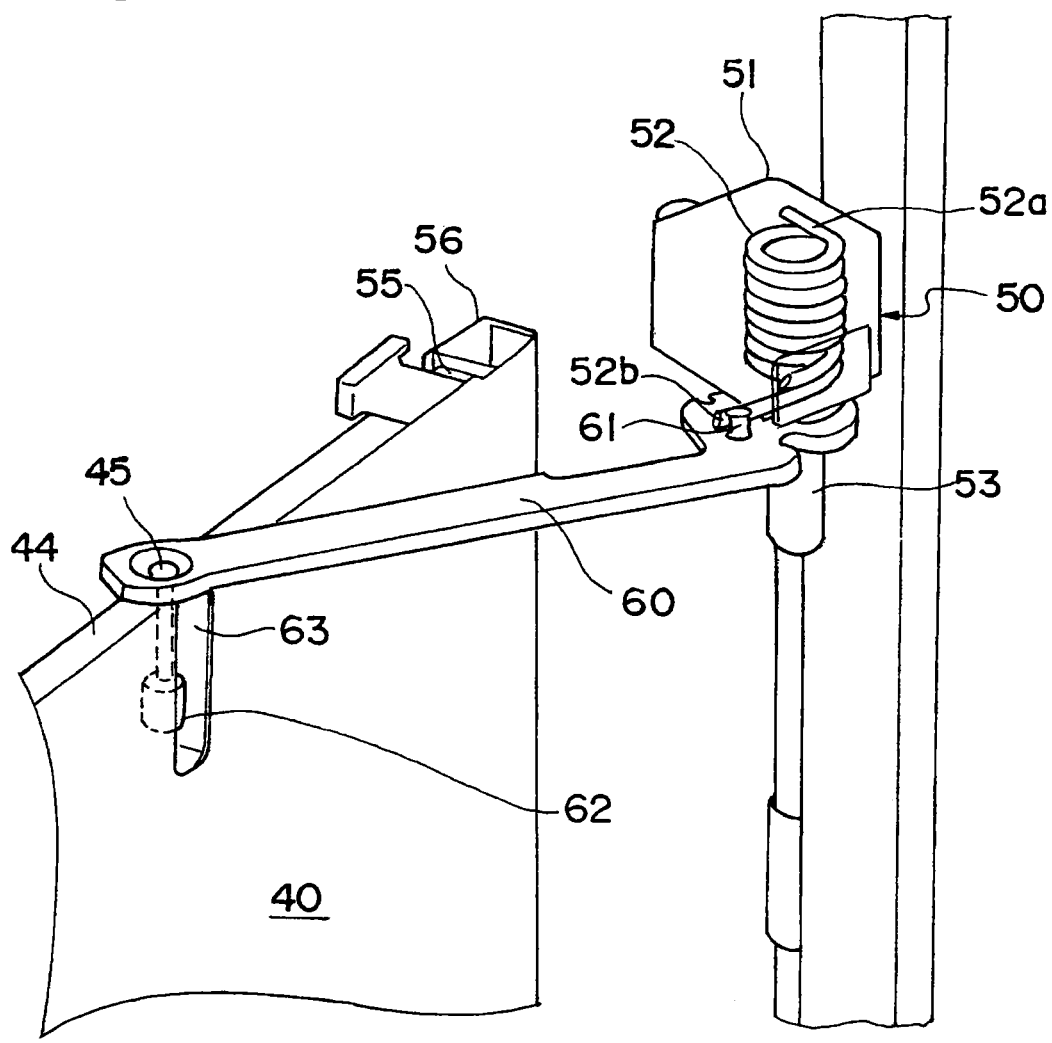
FIG. 8 is a partially enlarged perspective view of a structure for performing automatic closing of the door structure of the aircraft restroom shown in FIG. 1.

FIG. 8 is a partially enlarged perspective view of a structure for performing automatic closing of the door structure of the aircraft restroom shown in FIG. 1. As shown in FIG. 8, the upper end edge 44 of the door 40 is connected to the restroom main body 5 with the automatic closing device 50 and the linkage 60 interposed therebetween. The automatic closing device 50 includes, inside itself, a torsion spring 52 having one end portion 52a fixed to a case 51 and the other end portion 52b engaged with a pin 61 standing on the linkage 60. When the door 40 is opened, the torsion spring 52 is twisted in a winding direction by turning operation of the linkage 60 through the pin 61 and energy is stored by torsional deformation of the spring. If a hand is released from the door 40, a force of the torsion spring 52 for winding again applies a force in a closing direction shown in the drawing on the linkage 60 via the pin 61 and therefore the door 40 is automatically closed. In this manner, the door 40 automatically moves in the closing direction when it is released from the hand, closing speed of the door 40 is adjusted by a damper so as not to be excessively high, and a noise level of closing of the door 40 is lowered as well in consideration of a cabin environment.

The damper may be a rotary damper 53 provided between the linkage 60 and a frame of the door 40 below the torsion spring 52. Because the damper 53 is disposed parallel to the torsion spring 52 between the linkage 60 and the door frame, rotation of the linkage 60 is input to the rotary damper 53 and the rotary damper 53 performs functions of slowing down the rotation and dampening momentum of the closing door 40 when the door 40 tries to close due to the force of the torsion spring 52 for winding again.

A release lever 62 is connected to a lower portion of the pivot portion (joint pin) 45 turnably connecting the upper end edge 44 of the door 40 and the linkage 60. A notch 63 is formed in the upper end edge 44 of the door 40 to allow access to the release lever 62 from outside the door 40, i.e., from a side of the aircraft aisle, and the release lever 62 is provided in an exposed state in the notch 63. By pushing down the release lever 62, it is possible to disengage the pivot portion 45 from the linkage 60. Therefore, in an emergency when a passenger has fallen down in the restroom or at a time of cleaning the restroom, it is possible to disengage the door 40 and the linkage 60 from each other without using special tools. By sliding the sliding guide structure to the position of the detachment and attachment notch 17 beyond the normal movement range and detaching the sliding guide structure from the rail 16 through the detachment and attachment notch 17 in this position, it is possible to detach the door 40 that has been disengaged from the linkage 60 from the front panel 10. Because a soft rubber trim 56 is attached along the side end edge 42a opposite to the handle 41 side of the door 40 as shown in FIG. 8, the door 40 does not damage fingers even if a user gets his/her fingers caught in the door 40 in closing the door 40.

Figure 9:
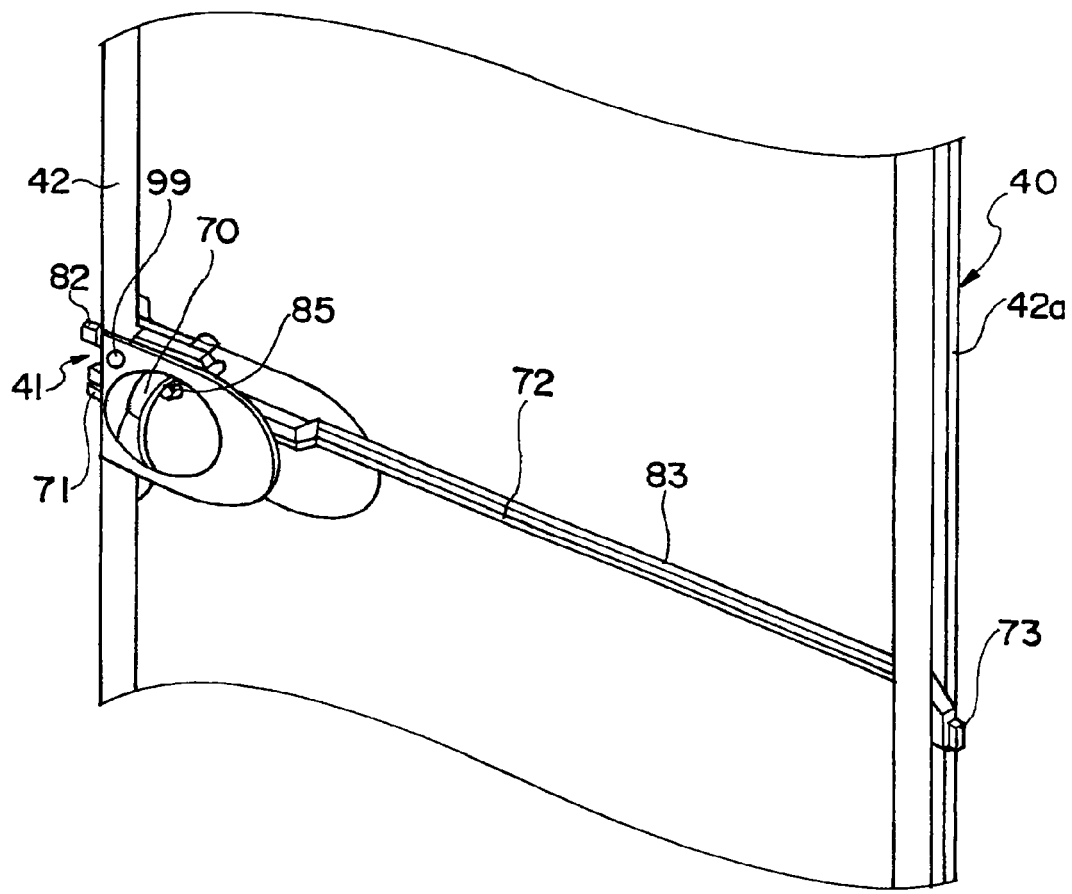
FIG. 9 is a partial perspective view of a portion including an outer handle of an door shown in FIG. 1 and seen from outside the door.
Figure 10:
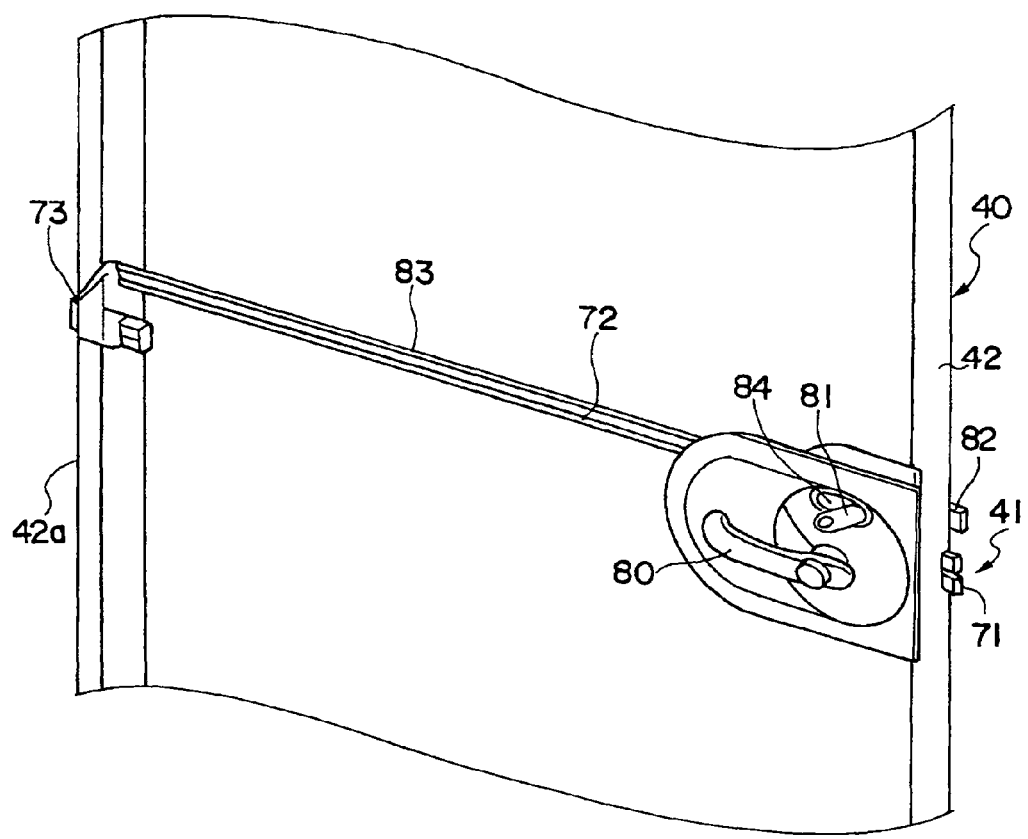
FIG. 10 is a partial perspective view corresponding to FIG. 9 and showing a portion including an inner handle of the door and seen from inside the door.

FIG. 9 is a partial perspective view of a portion including the handle portion 41 of the door shown in FIG. 1 and seen from outside the door. FIG. 10 is a partial perspective view corresponding to FIG. 9 and seen from inside the door. Both the drawings show internal structures with surface panels of the door 40 detached. As shown in FIGS. 9 and 10, the handle portion 41 of the door 40 has the door handles of different shapes on the inside and the outside. In other words, provided on the outside is a paddle type handle 70 on which a user can hook his/her fingertips without holding it to operate and provided on the inside of the restroom is a lever type handle 80 that is easy to operate. By employing different types of handles on the inside and outside, even a passenger having a disability in his/her hand can open or close the door.

When the user hooks his/her fingers on the paddle type handle 70 from outside the door 40 to pull and raise the handle 70 or when the user rotates the lever type handle 80 in any direction from inside the door 40, the operation is converted into a protruding or retracting operation of a main latch 71 provided to protrude from the side end edge 42 near the handles 70 and 80 of the door 40 via an internal mechanism (described later in detail) and a protruding or retracting operation of a sub-latch 73 provided to protrude from the side end edge 42a on the far side from the handles 70 and 80 through a rod 72 traversing the door 40. The main latch 71 and the sub-latch 73 are respectively made up of latch bolts. When the main latch 71 and the sub-latch 73 protrude, they are simultaneously engaged in a main latch engagement hole portion and a sub-latch engagement hole portion disposed in the frame of the restroom main body 5 to thereby main-lock the door 40 on opposite sides to reliably close the door. When both the latches 71 and 73 retract and become disengaged from both the engagement hole portions, the door 40 can be pulled and opened as it is. In this manner, with the latch structure of the door 40, the main latch 71 and the sub-latch 73 respectively provided on the left and right sides of the door are actuated synchronously by operating any of the paddle type and lever type handles 70 and 80 and by operating the lever type handle 80 in any direction of clockwise and counterclockwise directions. Therefore, it is unnecessary to separately operate the respective latches 71 and 73 and the door 40 can be fixed firmly when the latches 71 and 73 are closed.

Even if a passenger or the like enters the restroom and operates the handle 80 to main-lock the door 40, it is still possible to operate the handle 70 from outside to release the main lock of the door 40. Therefore, as another lock mechanism to be operated by the passenger or the like in the restroom from inside the restroom to lock the door 40, an auxiliary lock is provided. In other words, in the vicinity of the handle 80, a slide lever 81 can slide laterally in a slot 84. The slide lever 81 is connected to a slide bolt 82 inside the handle portion 41. When the slide lever 81 is slid rightward as shown in FIG. 10, the slide bolt 82 protrudes from the side end edge 42 and is engaged in an engagement hole portion on an opposite side to auxiliary-lock the door 40. Moreover this movement of the slide bolt 82 is converted into a protruding operation of a sub-latch 86 from the side end edge 42a through a rod 83 traversing the door 40 to auxiliary-lock the door 40 at the sub-latch 86 as well. The auxiliary lock with the slide bolt 82 cannot be cancelled by operating the paddle type handle 70 from outside the door 40. When the slide lever 81 is slid in an opposite direction, the slide bolt 82 and the sub-latch 86 engaged in the engagement holes are disengaged and the auxiliary lock can be released.

As a safety measure in case the slide lever 81 is operated from inside the restroom to engage the slide bolt 82 and the sub-latch 86 and it is impossible to release the auxiliary lock of the door 40, a hidden lever 85 is disposed in the paddle type handle 70 so that the crew can release the door lock without using tools. The hidden lever 85 is connected to the slide bolt 82 and it is possible to release the auxiliary lock by the slide bolt 82 and the sub-latch 86 by operating the hidden lever 85. Moreover, the slide bolt 82 may be made up of a magnet body to supply electric power to the restroom in synchronization with the locking.

Figure 11:
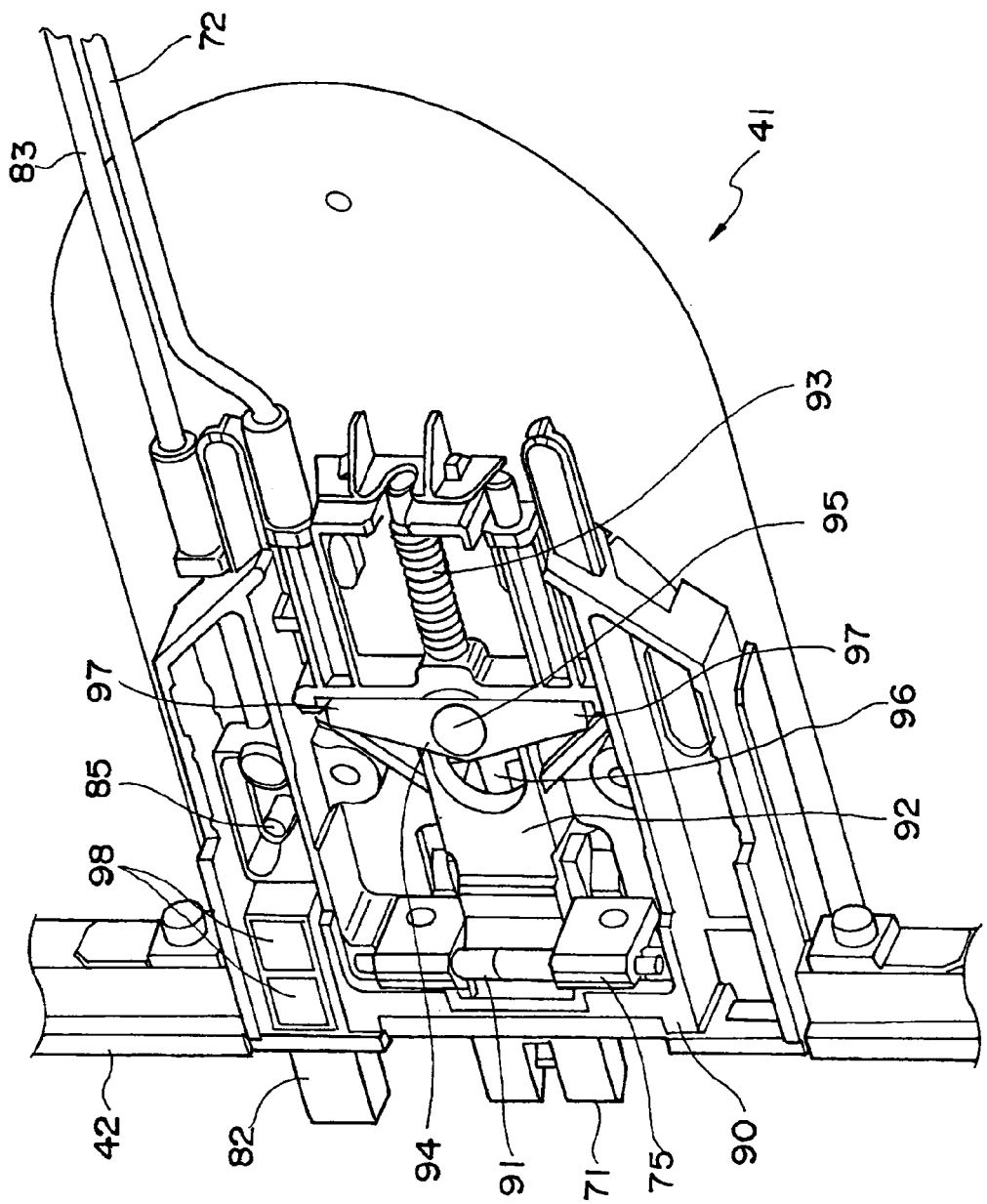
FIG. 11 is a perspective view of an internal mechanism of a handle portion.

FIG. 11 shows the internal mechanism of the handle portion 41 in a perspective view. In the paddle type handle 70, a base attachment 75 is supported on a frame 90 of the handle portion 41 to be turnable about a vertical shaft 91. A latch main body 92 integrally connected to the main latch 71 is slidably supported on the frame 90 in the lateral direction and is constantly biased by a spring 93 in such a direction that the main latch 71 protrudes from the side end edge 42 (i.e., in a locking direction of the door 40). Therefore, in the closed state of the door 40, the main latch 71 protrudes from the side end edge 42 due to a biasing force of the spring 93 applied to the latch main body 92, the sub-latch 73 protrudes from the side end edge 42a through the rod 72, and the door 40 is locked by both the latches 71 and 73. If the paddle type handle 70 is pulled and raised, the base attachment 75 turns about the vertical shaft 91 to slide the latch main body 92 against the biasing force of the spring 93, retract the main latch 71 into the side end edge 42, and simultaneously retract the sub-latch 73 into the side end edge 42a through the rod 72 to thereby release the lock (main lock) by both the latches 71 and 73.

The lever type handle 80 is connected to a turning lever 94 housed in the latch main body 92 by a central shaft 95. The central shaft 95 is in an elongated hole 96 in the latch main body 92 and is prevented from interfering with sliding movement of the latch main body 92 due to operation of the paddle type handle 70. When the lever type handle 80 is turned in any of the clockwise and counterclockwise directions, the turning lever 94 turns about the central shaft 95 and any of two tip end portions 97, 97 of the turning lever 94 comes in contact with the latch main body 92 according to the turning direction to slide the latch main body 92 against the biasing force of the spring 93. Operations after that are similar to those for operating the paddle type handle 70 and therefore will not be described again.

At an upper portion in the frame 90, the slide bolt 82 connected to the hidden lever 85 is slidably disposed. A color display portion 98 is provided to the slide bolt 82 and can indicate the occupied or unoccupied state (e.g., red indicates the occupied state while green indicates the unoccupied state) of the restroom by selectively showing the color display portion 98 to the outside through a window 99 formed in the surface of the door 40.

Figure 12:
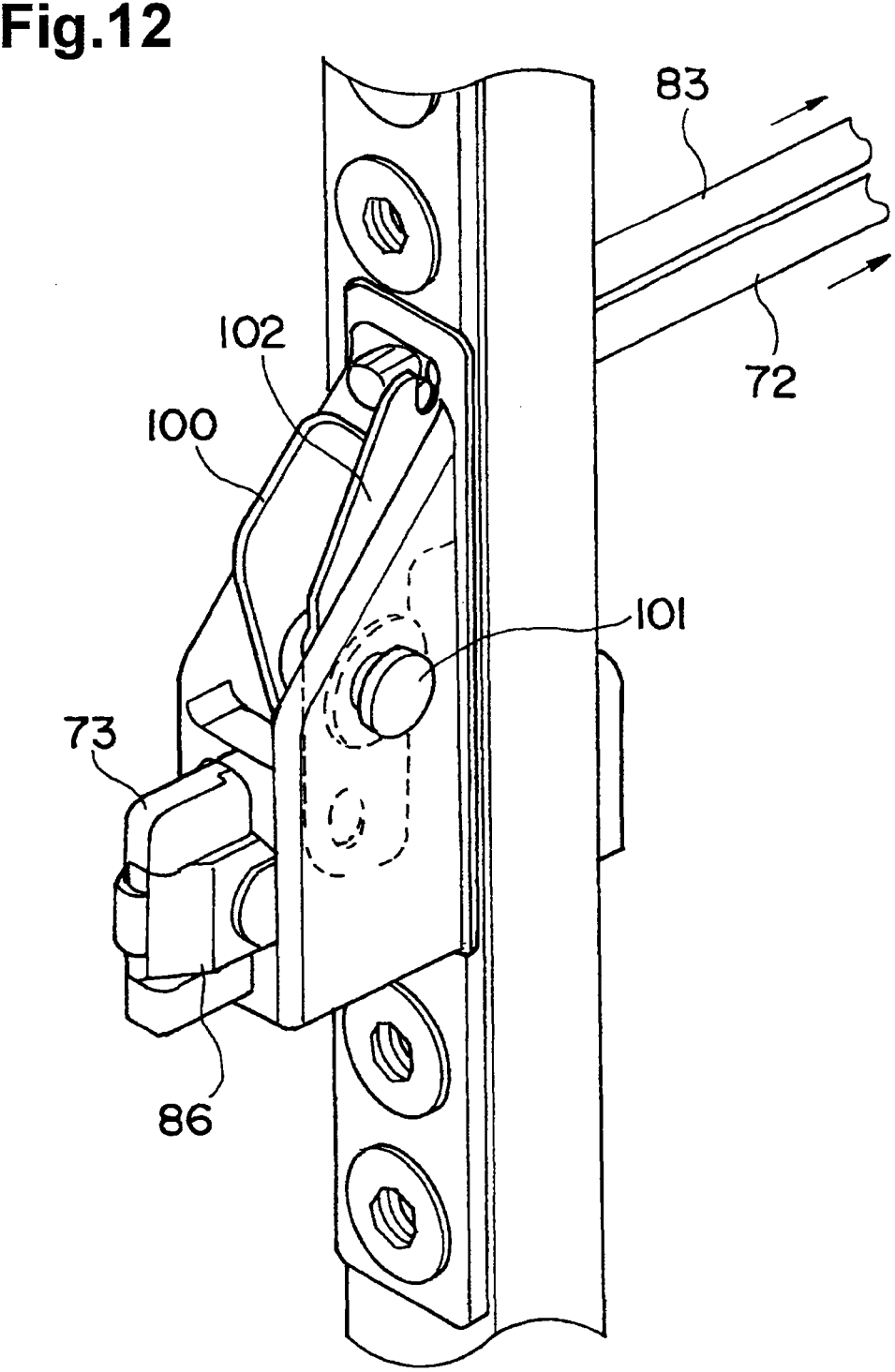
FIG. 12 is a perspective view showing states of sub-latches when both of a main lock and an auxiliary lock are in locked states in the handle portion.
Figure 13:
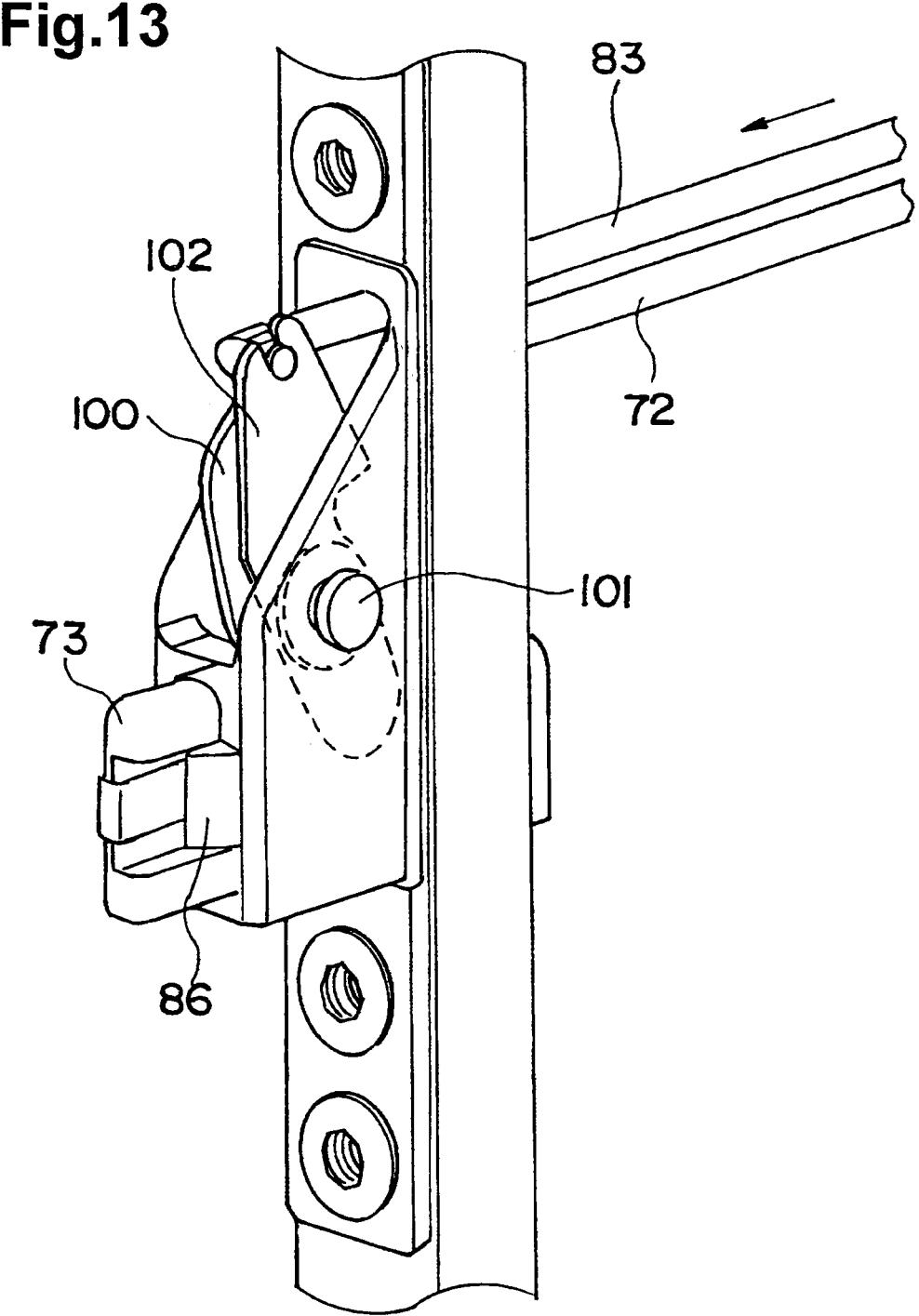
FIG. 13 is a perspective view showing states of the sub-latches when the main lock is in the locked state while the auxiliary lock is in a lock released state in the handle portion.
Figure 14:
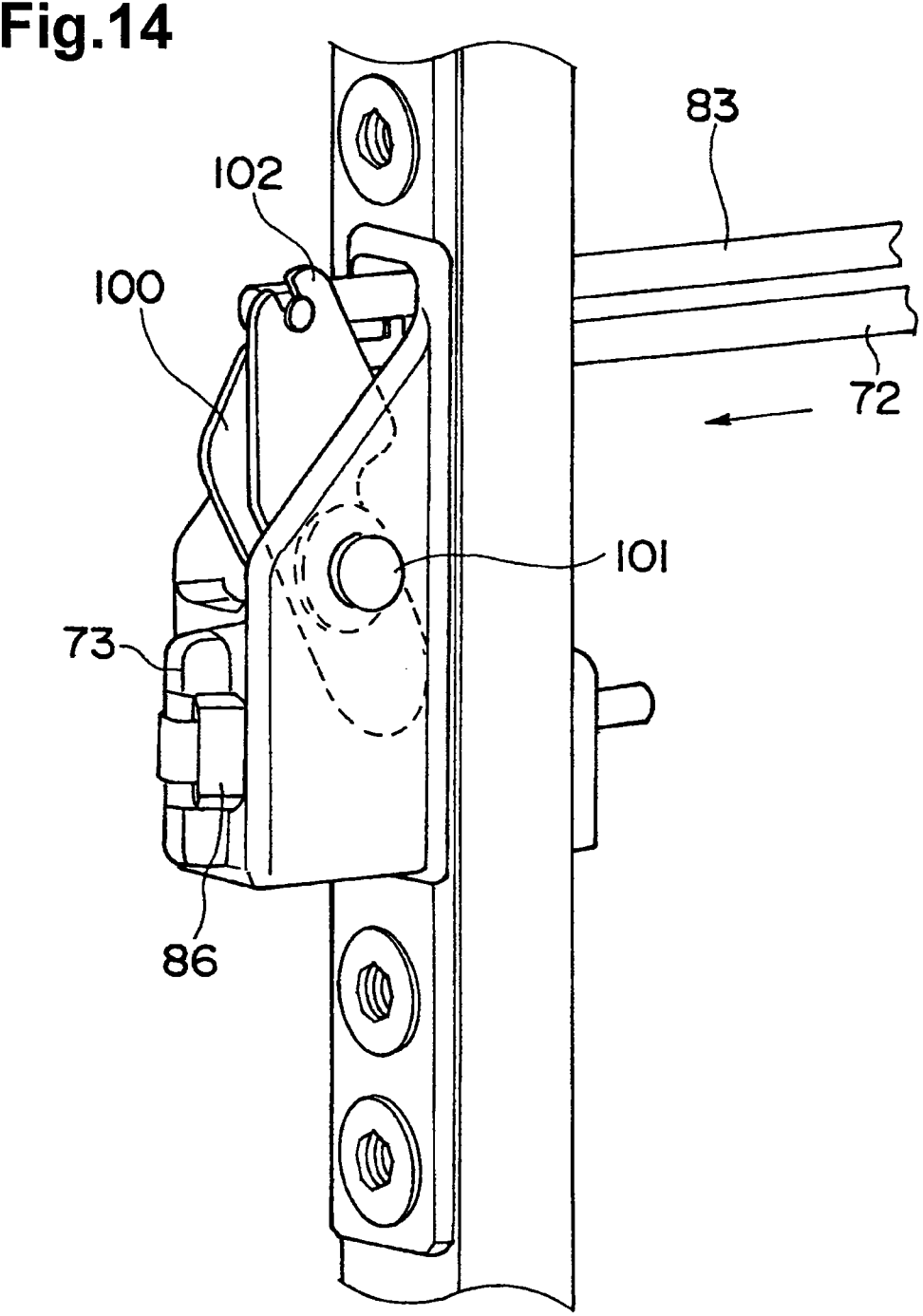
FIG. 14 is a perspective view showing states of the sub-latches when both the main lock and auxiliary lock are in the lock released states in the handle portion.

FIGS. 12 to 14 show engaged and disengaged states of the sub-latches of the door structure of the aircraft restroom. FIG. 12 is a perspective view showing states of the sub-latches 73 and 86 when both the main latch 71 and slide bolt 82 are engaged on the handle portion 41 side. When the door 40 is closed, the rod 72 is retracted in the door panel and a plate 100 is turned at a horizontal shaft 101 at a central portion to protrude the sub-latch 73. Similarly, because the slide bolt 82 is engaged, the rod 83 is retracted in the door panel and a plate 102 is turned at the horizontal shaft 101 at a central portion to protrude the sub-latch 86 corresponding to the slide bolt 82. Therefore, both the main lock and the auxiliary lock of the door 40 are in the locked states due to both the sub-latches 73 and 86.

FIG. 13 shows a state in which the auxiliary lock due to the slide bolt 82 is released from the state shown in FIG. 12. Because a tip end portion of the rod 83 protrudes from the door panel, the plate 102 turns about the horizontal shaft 101 and the sub-latch 86 retracts. As a result, the auxiliary lock is released. At this time, however, the sub-latch 73 (i.e., the main lock) is still in the engaged state. FIG. 14 shows a state in which the main lock is released as well from the state shown in FIG. 12. Because a tip end portion of the rod 72 forming the main lock protrudes from the door panel as well, the plate 100 turns about the horizontal shaft 101 and the sub-latch 73 retracts. As a result, both the sub-latches 73 and 86 are disengaged and all the locks of the door 40 are released.

Although the opening and closing handles and the locking slide bolt are separate from each other in the operating portions of the latches 71 and 73 in the conventional restroom door structure, they are compactly put together in the invention as described above to thereby improve operability and economic efficiency.

Although the embodiment of the door structure of the aircraft restroom has been described above, it is apparent that the invention can be applied to a door structure of a restroom for other vehicles where light weight is pursued.

What is claimed is:

1. A pivotable door structure of an aircraft restroom comprising:
   a door slidably hung in a first position at its upper end edge from a rail disposed at an upper portion of a door frame of said aircraft restroom;
   a linkage positioned above the upper edge of the door that pivotably connects the upper end edge of the door to the door frame in a second position that is different from the first position;
   a damper; and
   an automatic closing device mounted on an upper portion of said aircraft restroom, wherein
   the linkage is arranged between the door and the automatic closing device and includes one end portion pivotably connected to the automatic closing device and an opposing end portion pivotably connected to the upper end edge of the door, the automatic closing device includes a spring that provides a force to the linkage to constantly bias the door in a closing direction, the spring is a torsion spring that converts turning of the linkage into torsional deformation, the damper is configured to reduce a turning speed of the linkage turned in a returning direction by the resilience of the torsion spring, the door is slidably engaged in a position of its lower end edge corresponding to the first position with a rail disposed at a lower portion of the door frame, a pivot portion located between the door and the linkage is provided with a release lever that attaches and detaches the pivot portion, and wherein the linkage is positioned between the damper and the spring.

2. The door structure of an aircraft restroom according to claim 1, wherein a door trim on a hinge side of the door is made of soft rubber.

3. The door structure of an aircraft restroom according to claim 1, wherein a door handle provided outside the restroom of the door is a paddle type handle and a door handle provided inside the restroom of the door is a lever type handle.

4. The door structure of an aircraft restroom according to claim 3, wherein, as a main lock by operation of the door handles, the door is latch-engaged with or disengaged from the door frame by a main latch protruding and retracting at a side end edge of the door near the door handles and a sub-latch protruding and retracting via a rod at a side end edge of the door far from the door handle.

5. The door structure of an aircraft restroom according to claim 4, wherein a slide bolt for auxiliary locking is provided in an adjacent position to the lever type handle and a hidden lever that releases the auxiliary lock by the slide bolt without using tools is mounted in the paddle type handle.

6. The door structure of an aircraft restroom according to claim 1, wherein a door panel of the door is made up of a honeycomb panel.

* * * * *